Figure 1:
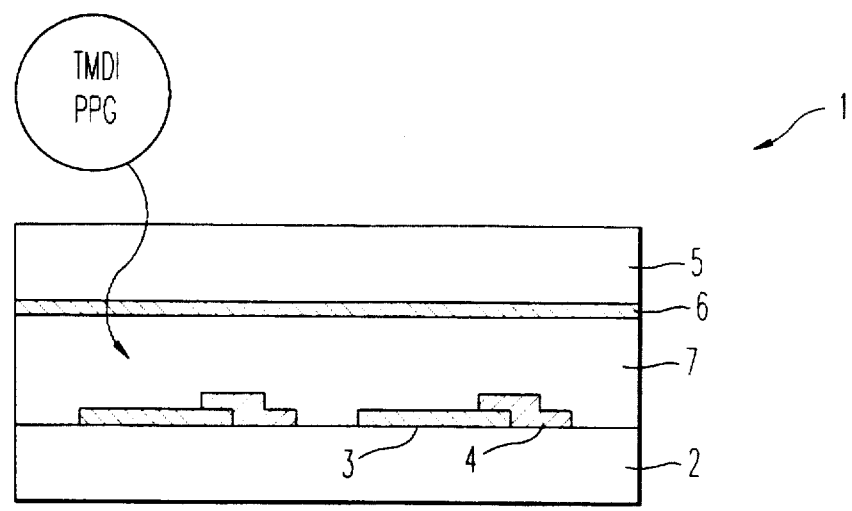

United States Patent [19]

Niiyama et al.

[11] Patent Number: 5,776,364
[45] Date of Patent: Jul. 7, 1998

[54] LIQUID CRYSTAL OPTICAL ELEMENT, A METHOD FOR PRODUCING THE SAME AND A PROJECTION TYPE LIQUID CRYSTAL DISPLAY APPARATUS

[75] Inventors: Satoshi Niiyama; Kazuhiko Yamada; Hiroshi Kumai, all of Kanagawa, Japan

[73] Assignee: AG Technology Co., Ltd., Yokohama, Japan

[21] Appl. No.: 636,989

[22] Filed: Apr. 24, 1996

[30] Foreign Application Priority Data

Apr. 24, 1995 [JP] Japan ................ 7-098894

[51] Int. Cl.$^6$ .................................................. G02F 1/13
[52] U.S. Cl. .................. 252/299.01; 252/299.5; 428/1; 349/86; 349/93
[58] Field of Search ............... 428/1; 252/299.5, 252/299.01; 349/86, 93

[56] References Cited

U.S. PATENT DOCUMENTS

| | | | |
|---|---|---|---|
| 4,818,070 | 4/1989 | Gunjima et al. | |
| 4,834,509 | 5/1989 | Gunjima et al. | 349/89 |
| 5,103,327 | 4/1992 | Hirai et al. | 349/10 |
| 5,150,232 | 9/1992 | Gunkima et al. | 349/10 |
| 5,196,952 | 3/1993 | Hirai et al. | 349/10 |
| 5,216,531 | 6/1993 | Hirai et al. | 349/93 |
| 5,235,445 | 8/1993 | Hirai et al. | 349/89 |
| 5,283,675 | 2/1994 | Ooi et al. | |
| 5,379,137 | 1/1995 | Hirai et al. | 349/86 |
| 5,386,306 | 1/1995 | Gunjima et al. | 349/89 |

*Primary Examiner*—Mark Nagumo
*Attorney, Agent, or Firm*—Oblon, Spivak, McClelland, Maier & Neustadt, P.C.

[57] ABSTRACT

To a bifunctional acrylurethane compound having acrylate groups at its both ends, which is a reaction product of polypropylene glycol, a mixture of 2,2,4-trimethyl-1, 6-diisocyanatohexane and 2,4,4-trimethyl-1, 6-diisocyanatohexane, and 2-hydroxyethyl acrylate, 2-ethylhexyl acrylate, 2-hydroxyethyl acrylate, nematic liquid crystal and a photo-reaction initiator are mixed to obtain a uniformly dissolved mixture, and the mixture undergoes a phase separation treatment by photopolymerization to thereby form a liquid crystal/polymer composite material layer 7 which is utilized for a liquid crystal optical element 1. The phase separation by photo-polymerization improves controllability of the structure of the liquid crystal/polymer composite material layer. In particular, the shape of the polymer phase with respect to the liquid crystal phase is precisely controlled to adjust the optical characteristic performance of liquid crystal domains in a connected phase of liquid crystal; to improve the electro-optical characteristics in a low temperature region, and to obtain a display of high contrast and low hysteresis.

14 Claims, 1 Drawing Sheet

LIQUID CRYSTAL OPTICAL ELEMENT, A METHOD FOR PRODUCING THE SAME AND A PROJECTION TYPE LIQUID CRYSTAL DISPLAY APPARATUS

The present invention relates to a liquid crystal optical element of high efficiency in which liquid crystal held in a polymer phase is interposed between a pair of substrates with electrodes. Specifically, it relates to an improvement in the electro-optical characteristics of the liquid crystal optical element, which is used as a display device, in study of the molecular structure of the polymer phase. Further, in the present invention, a projection type liquid crystal display apparatus using such liquid crystal optical element is disclosed.

In recent years, liquid crystal displays have been widely used for personal word processors, hand-held computers, portable TV sets and so on by making use of advantages of low consumption rate of power, low voltage driving and so on. Of these liquid crystal displays, liquid crystal display elements having active elements which are excellent in viewing angle, of high speed response and capable of high density display, have particularly been noted and developed.

At the beginning, liquid crystal display elements (LCDS) of dynamic scattering type (DSM) which transmit and scatter light have been proposed. However, such DSM-LCDs had a disadvantage of large current consumption because a high value of electric current passed in the liquid crystal. Now, LCDs of twisted nematic type (TN) using a polarization plate have been widely used in markets as display elements for portable TVs or portable type information devices. Since the TN-LCDs have a very small leak current and a small power consumption rate, they are suitable for usage in which batteries are used as power sources.

In DSM-LCDs having active elements, the leak current of the liquid crystal itself is large. Accordingly, it was necessary to provide a large storage capacitance in parallel to each picture element, and the power consumption of the liquid crystal display elements themselves was large.

Since the leak current of the liquid crystal itself in the TN-LCDs is very small, it is unnecessary to provide a large storage capacitance, and the power consumption of the liquid crystal element itself can be small. However, there is a problem that the transmittance of light is small because two polarization plates which transmit and absorb light are required in the TN-LCDs. In particular, when a color filter is used to obtain a colored display, only several percents of incident light can be utilized. Accordingly, a strong power source is required, as a result of which power consumption rate is increased.

There are further problems that an extremely strong light source is required when a picture image is to be projected which causes difficulty in obtaining a high contrast ratio on a projection screen and which changes the operating condition of the liquid crystal display element due to heat from the power source.

In order to solve the above-mentioned problems, a liquid crystal display element has been proposed wherein a liquid crystal/polymer composite material in which nematic liquid crystal is held in a matrix comprising polymer or the like is used in order to utilize the scattering-transmitting characteristics, and control of turning-on and off light is directly conducted without the polarization plates. Such liquid crystal display element is called a liquid crystal/polymer composite material display element, a dispersion type liquid crystal display element or a polymer dispersion type liquid crystal display element.

Japanese Unexamined Patent Publication No. 271233/1988 (U.S. Pat. No. 4,834,509) (referred to as a conventional technique 1) discloses that a mixture of liquid crystal and a polymer material is produced by using a vinyl compound as the polymer material, specifically, an acryloyl compound containing urethane acrylate oligomer, and the mixture is subject to a Polymerization Induced Phase Separation (PIPS) process to form a polymer phase and a liquid crystal phase in a liquid crystal whereby a liquid crystal/polymer composite material of high performance can be formed. The publication also disclose that a light modulator of good appearance and high performance can be obtained by controlling light passing through the layer of liquid crystal/polymer composite material with an outer electric signal turned-on and off.

Japanese Unexamined Patent No. 196229/1986 (referred to as a conventional technique 2) discloses as general description a liquid crystal display element formed by combining a liquid crystal/polymer composite material layer comprising polymer and liquid crystal with active elements such as TFTs or MIMs.

In the initially developed liquid crystal display elements provided with such liquid crystal/polymer composite materials as described in the conventional techniques 1 and 2, there was hysteresis in the voltage-transmission characteristics (V-T curves) in the electro-optical characteristics of the liquid crystal display elements. Although the hysteresis is negligible in a window or a shutter which is operable under the condition of applying two values, there was a problem that the transmission of light varies between a state that a driving voltage rises and a state that the driving voltage falls in a display element of high performance which requires to display a half tone. Accordingly, an image-sticking phenomenon wherein a picture image which had appeared in the display just before the changing of picture remained in the present display for several seconds.

In consideration of such problem, Japanese Unexamined Patent Publication No. 186535/1994 (U.S. Pat. No. 5,196,952) (referred to as a conventional technique 3) discloses an invention concerning the physical values of a liquid crystal material and control of the structure of a liquid crystal phase as a result of having paid attention to the physical values of the liquid crystal used and the spatial dispersion of the liquid crystal phase in a liquid crystal cell. In the publication, there is description concerning achievement of reducing the hysteresis to a required extent in a display element. For instance, there is description that a combination of a refractive index anisotropy $\Delta n$ of liquid crystal of 0.18 or more and a dielectric anisotropy $\Delta \epsilon$ of 5–13 is preferable. Also, there is description that the shape of liquid crystal phase with a certain deformation and a random arrangement of liquid crystal in the liquid crystal cell contribute to the reduction of the hysteresis.

Japanese Unexamined Patent Publication No. 134238/1993 (U.S. Pat. No. 5,235,445) (referred to as a conventional technique 4) discloses that in considering the elasticity of a polymer phase used, a polymer material having an elasticity of $3 \times 10^7 N/m^2$ or lower at 20° C. and $1 \times 10^3 N/m^2$ or more at 40° C. should be used. It also describes that control of the elasticity of the polymer to be within such range contributes greatly to the reduction of the hysteresis, and a beautiful display without an image-sticking can be obtained even when a moving picture is to be displayed.

Japanese Unexamined Patent Publication No. 123456/1995 (referred to as reference technique) pays attention to kinds of polymer material used in a liquid crystal/polymer composite material in an emulsion method. Specifically, it considers selection of a water soluble polymer effective for forming a liquid crystal capsule in the case of using an emulsion method. The publication is to stabilize the formation of liquid crystal emulsion; to control the dispersion structure of the liquid crystal capsule finally obtained, and to reduce the hysteresis.

As described above, the conventional techniques propose some improvements in the characteristics of the liquid crystal optical elements with the liquid crystal/polymer composite materials to obtain a certain degree of valuable performance. However, the stability of operation in a universal sense under various conditions could not be obtained. For instance, the strength of hysteresis on the V-T curve of the liquid crystal optical element sometimes exhibits a strong dependence on the working temperature of the liquid crystal optical element, and exhibits a tendency of increasing the intensity of hysteresis when the working temperature is low. Namely, the conventional liquid crystal optical element had a problem in the characteristics when the working temperature is lower than the normal temperature from the standpoint of practical use of the liquid crystal display element.

Now, a case that the above-mentioned liquid crystal optical element is combined with a projection light source and a projection optical system to form a projection type liquid crystal display apparatus, and a picture image is projected by irradiating light beams of several hundred thousands luxes to the liquid crystal display element in a room having a room temperature of 25° C.–28° C., is examined. The temperature of the liquid crystal display element is elevated by about 8° C. to 15° C. due to the strong light beams irradiated. In this case, however, there is found no image-sticking phenomenon due to the hysteresis in the liquid crystal display element even when a video display is effected. However, when a picture image is projected in the same manner as above in a room having a room temperature of 15° C., the image-sticking phenomenon took place due to the hysteresis in the liquid crystal display element when the video display was effected.

It is an object of the present invention to provide a liquid crystal optical element having higher brightness and higher contrast ratio than those of the conventional technique and capable of producing the element in a stable manner even when the working temperature is substantially at a low level.

Further, it is an object of the present invention to provide a liquid crystal optical element, liquid crystal display element and a projection type liquid crystal display apparatus capable of providing a beautiful half-tone display even in a lower temperature region and capable of reducing an image-sticking phenomenon due to the hysteresis of the liquid crystal/polymer composite material.

In accordance with the present invention, there is provided a liquid crystal optical element comprising a pair of substrates with electrodes and a liquid crystal/polymer composite material, which is interposed between the pair of substrates, in which the refractive index of a polymer phase substantially coincides with the ordinary refractive index ($n_o$) or the extraordinary refractive index ($n_e$) of liquid crystal at a voltage application time or a non-voltage application time, wherein the polymer phase is a cured product of a curable material comprising an addition-polymerizable urethane compound obtained from an aliphatic isocyanate compound having a side chain, which is referred to as a first invention.

Further, there is provided a liquid crystal optical element wherein in the first invention, the addition-polymerizable urethane compound is a reaction product of an aliphatic isocyanate compound having a side chain, a polyether polyol and a hydroxyl group-containing acrylate. This invention is referred to as a second invention.

Further, there is provided a liquid crystal optical element wherein in the second invention, the polyether polyol is polypropylene glycol. This invention is referred to as a third invention.

Further, there is provided a liquid crystal optical element wherein in any of the first to the third inventions, the curable material is a mixture of an addition-polymerizable urethane compound with other addition-polymerizable compounds. This invention is referred to as a fourth invention.

Further, there is provided a liquid crystal optical element wherein in any of the first to the fourth inventions, an electric field penetrating the liquid crystal/polymer composite material is changed in response to an outer signal, and a half-tone display is effected due to a non-saturated electric field value. This invention is referred to as a fifth invention.

In more detail, the half-tone display is effected by adjusting a driving voltage applied across the opposing electrodes.

Further, there is provided a projection type liquid crystal display apparatus comprising a liquid crystal optical element described in any of the first to the fifth inventions, a projection light source and a projection optical system. The invention is referred to as a sixth invention.

Further, there is provided a method for producing a liquid crystal optical element comprising interposing a mixture of a curable material comprising an addition-polymerizable compound and liquid crystal between a pair of substrates with electrodes, and forming a polymer phase by curing the curable material and separating the liquid crystal by phase separation to thereby form a liquid crystal/polymer composite material comprising the polymer phase and the liquid crystal in which the refractive index of the polymer phase substantially coincides with the ordinary refractive index ($n_o$) or the extraordinary refractive index ($n_e$) of the liquid crystal at a voltage application time or a non-voltage application time, wherein the curable material comprises an addition-polymerizable urethane compound obtained from an aliphatic isocyanate compound having a side chain. The invention is referred to as a seventh invention.

Further, there is provided a method for producing a liquid crystal optical element wherein in the seventh invention, the addition-polymerizable urethane compound is a reaction product of an aliphatic isocyanate compound having a side chain, a polyether polyol and a hydroxyl group-containing acrylate. This invention is referred to as an eighth invention.

Further, there is provided a method for producing a liquid crystal optical element wherein in the eighth invention, the curable material is a mixture of an addition-polymerizable urethane compound with other addition-polymerizable compounds. This invention is referred to as a ninth invention.

Further, there is provided a method for producing a liquid crystal optical element wherein in any of the seventh to the ninth inventions, curing is conducted by irradiating light.

Further, there is provided a liquid crystal optical element wherein in the first invention, the liquid crystal in the liquid crystal/polymer composite material constitutes a continuous phase.

In accordance with the present inventions having the features described above, there can be provided a liquid crystal optical element or a liquid crystal display element which minimizes an image-sticking phenomenon due to hysteresis even under the condition of broader temperature range, has a high contrast ratio and allows the driving with a low voltage.

For the liquid crystal/polymer composite material of the present invention, design has to be made on the molecular structure of a polymer material for the polymer phase. And by adjusting the fine structure of the liquid crystal/polymer composite material, a beautiful dynamic display free from image-sticking is obtainable without increasing the hysteresis on the V-T curve of the liquid crystal optical element even in the operation at a lower temperature range.

Namely, the polymer material forming the polymer phase is formed from a cured product of a curable material comprising an addition-polymerizable urethane compound obtained from aliphatic isocyanate compound having a side chain. With such construction, the free volume of polymer for forming the polymer phase does not substantially change even in a low temperature range which is lower than the normal temperature when the polymer phase is used for a projection type liquid crystal display apparatus, and a shrinkage stress at the interface between the polymer phase and the liquid crystal, which is caused under temperature reduction can be small. Accordingly, a random arrangement of liquid crystal can be maintained as a whole even in a low temperature region, and an increase of the hysteresis strength of the liquid crystal display element can be suppressed.

In the present invention, there is used a liquid crystal/polymer composite material, specifically, including a polymer phase in liquid crystal, which is interposed between a pair of substrates with electrodes wherein the refractive index of the polymer phase substantially coincides with the refractive index of the liquid crystal in either state of applying a voltage or without applying a voltage, and the above-mentioned refractive indices do not coincide with each other in the other state. The polymer phase has a complicated spatial structure and provides a three-dimensional interface of the polymer phase to the liquid crystal in the liquid crystal cell.

In particular, a liquid crystal/polymer composite material in which a nematic liquid crystal having a positive dielectric anisotropy is held in the polymer phase, and the refractive index $n_p$ of the polymer phase substantially coincides with the refractive index $n_o$ of the liquid crystal, is used. The liquid crystal/polymer composite material is interposed between an active matrix substrate in which an active element is provided for each pixel electrode and an opposing electrode substrate with a opposing electrode.

The substrates with electrodes are such one made of glass, plastics, ceramics or the like on which electrodes are formed. Usually, the electrodes are formed to be transparent electrodes composed of ITO ($In_2O_3$—$SnO_2$), $SnO_2$ or the like. A metallic electrode made of material such as Cr, Al or the like may be used in combination of the above-mentioned electrodes, if necessary. When the electrodes are used for a reflection type display apparatus, they can be used as reflection electrodes. Further, as the pair of substrates, there may be a combination of an active matrix substrate and a counter electrode substrate.

The active matrix substrate is composed of a substrate on which electrodes and active elements such as thin film transistors (TFTs), thin film diodes, metal-insulation meterial-metal non-linear resistor devices (MIMs) or the like are formed. A single or a plurality of active elements are connected to each of the picture element electrodes. The counter electrode substrate is composed of a substrate on which electrodes are formed, and the counter electrode is combined with the active matrix substrate so as to be capable of providing a display.

The liquid crystal/polymer composite material is interposed between the pair of substrates with electrodes. The liquid crystal/polymer composite material is such one that the refractive index of liquid crystal in the liquid crystal/polymer composite material is changed depending on a state of whether or not a voltage is applied to. When the refractive index of the polymer phase substantially agrees with the refractive index of the liquid crystal, light is transmitted therethrough, and when the former does not agree with the later, light is scattered. Since no polarization plates are used in the present invention, a bright display can easily be obtained. In this case, since the refractive index of the polymer phase is in substantially coincidence with $n_o$ of the liquid crystal used, light is transmitted when a voltage is applied, and light is scattered when no voltage is applied. When a voltage is applied, liquid crystal molecules are oriented in parallel to the direction of electric field. Accordingly, it is easy to control the refractive indices, and a high transmittance is obtainable in a display element of this type when the light is transmitted.

The liquid crystal optical element of the present invention is mainly used as a liquid crystal display element by which a person can observe a display. It can also be used as a light controllable window or an optical shutter by which light is turned on and off. The liquid crystal display element can be used not only as a direct view type display element but also a projection type display element. When the liquid crystal display element is used as the direct view type display element, a display apparatus may be constituted in combination of a back light, a lens, a prism, a mirror, a diffusion plate, a light absorbing material, a color filter and so on in accordance with the display characteristics which are desired to obtain. The liquid crystal display element of the present invention is, in particular, suitable for a projection type display. The liquid crystal display element can be combined with a projection light source, a projection optical system and so on to constitute a projection type liquid crystal display apparatus. The projection light source and the projection optical system may be a conventional projection light source and a conventional projection optical system such as a lens or the like. Generally, the liquid crystal display element is arranged between the projection light source and a projection lens.

In the liquid crystal display element of the present invention, a liquid crystal/polymer composite material having an operation mode of transparent-scattering type, e.g. a liquid crystal/polymer composite material formed of a cured product of liquid crystal and a curable material, is interposed between a pair of substrates with electrodes. The polymer phase may be a solidified product obtained by solidifying another solidifying material. Specifically, the liquid crystal optical element of the present invention comprises a liquid crystal/polymer composite material of a such structure that the polymer phase and the liquid crystal are phase-separated in a three-dimensional space. Then, the liquid crystal/polymer composite material is interposed between the pair of substrates with electrodes. When voltage is applied across the electrodes, the refractive index of the liquid crystal is changed, and the relation between the refractive index $n_p$ of the polymer phase and the refractive index of the liquid crystal is changed. When the refractive indices of both the polymer phase and the liquid crystal phase are made coincident with each other, a state of transmittance is obtained, and when not, a state of scattering is obtained.

The structure of the phase separated polymer and liquid crystal is three-dimensional. The three-dimensional structure may be formed by introducing the liquid crystal into a large number of fine holes formed in the polymer phase; or the liquid crystal is impregnated into the polymer phase having a network structure; or a large number of microcapsules containing therein liquid crystal are dispersed in the polymer phase; or liquid crystal phases which are separated in a particle form are connected to each other in a three-dimensional space. The above-mentioned structure of three-dimensional phase separation can generally be classified into a continuous liquid crystal phase structure wherein a 60–100% of liquid crystal phases are connected to or communicated with each other through the polymer phase, or a structure of phase separation wherein the proportion of the connected or communicated liquid crystal phases is 30% or less and the remaining liquid crystal phases are independent. In a phase-separated structure wherein the quantity of the interconnected liquid crystal phase is small, for example, the liquid crystal is phase-separated into a form of particle-like separate capsules, i.e., discrete liquid crystal capsules, the interface for generating the scattering performance is limited to the interface between the liquid crystal phase and the polymer phase. In such a case, in order to increase the scattering performance of the liquid crystal/polymer composite material, it is necessary-to increase the number of phase-separated liquid crystal capsules. However, there is limitation with respect to spatial arrangement in order to increase the density of the capsules while the optimum average particle size of the capsules is maintained.

In comparing the discrete liquid crystal capsule structure with one where the liquid crystal is in the form of a continuous phase, the use of the continuous liquid crystal phase structure is preferable in order to obtain a liquid crystal optical element having a high haze value (low light transmission) in a scattering state and a high contrast ratio. The continuous liquid crystal phase structure allows for light scattering not only at the polymer/liquid crystal interface but also at the interfaces between the liquid crystal domains. It is known that in liquid crystal not under the influence of an electric field but in contact with a surface, that the liquid crystal exists in the form of randomly orientated domains which contribute to light scattering. It is believed that when the liquid crystal exists as a continuous phase in the polymer/liquid crystal composite there are significantly more liquid crystal domains than when the liquid crystal is in the form of discrete capsules.

The liquid crystal/polymer composite material used in the present invention may be prepared by conventional techniques as follows. A solution or latex of liquid crystal and either a curable compound or a polymer is formed. Then, the solution or the latex is cured or solidified by the application of light or heat, or by removing solvent or by subjecting it to reactive curing thereby causing phase separation of the polymer phase and the liquid crystal. The preferred technique involves dissolving the liquid crystal in either a monomer mixture or prepolymer followed by polymerization which induces phase separation. The use of a latex is not preferred since this technique may result in composite in which there is a preferred alignment of the liquid crystal i.e., the liquid crystal is oriented in the plane of the device which may adversely affect the performance of the device.

In the present invention, an addition-polymerizable urethane compound obtained from an aliphatic isocyanate compound having a side chain is used as the curable material. Further, the curable material is rendered to be of a photosetting type or a thermosetting type, which is preferable because it can be cured in a closed system. In particular, the curable material of photosetting type is preferable since it can be cured in a short period of time with little influence of heat and a uniform phase separation structure can be obtained in a stable manner.

As a specific method for production, a cell may be formed by using a sealing material; an uncured mixture of liquid crystal and a curable compound is injected through an injection port in the same manner as in the conventional nematic liquid crystal display element, and after sealing the injection port, the mixture can be cured by light irradiation or heating, preferably by irradiation to avoid the problems which may be encountered by the changed with the solubility between the liquid crystal and the curable compound in the enclosed cell upon heating.

In the liquid crystal optical element of the present invention, a method without using a closed cell may be used. For instance, an uncured mixture of the liquid crystal and the curable compound are fed onto a substrate provided with a transparent electrode; another substrate with an electrode is overlaid on the former, and the substrates are subjected to light irradiation to thereby cure the curable compound. Thereafter, a sealing material is coated on the peripheral portion of the assembly to seal the peripheral portion. According to this method, since it is only required to supply the uncured mixture of the liquid crystal and the curable compound by means of coating such as roll coating, spin coating, printing or by using a dispenser or the like, the injection step can be simple and productivity is very high.

Further, the uncured mixture of the liquid crystal and the curable compound may be incorporated with spacers for controlling the inter-substrate gap such as ceramic particles, plastic particles, glass fibers or the like, pigments, dyes, viscosity controllers or any other additives which do not adversely influence to the performance of the present invention.

When the uncured mixture in the optical element is cured under a condition that a sufficiently high voltage is applied to only a specified portion, that portion can be rendered to be normally light-transmitting state. Accordingly, when a fixed display is desired, such normally light transmitting portion may be formed.

A higher transmittance is preferable in a light transmission state of the liquid crystal optical element having the liquid crystal/polymer composite material, and the haze value in a scattering state is preferably not less than 80%.

It is preferable that in a state of applying a voltage, the refractive index of the polymer phase agrees with $n_o$ of the liquid crystal used. Then, light is transmitted when the refractive index of the polymer phase agrees with the refractive index of the liquid crystal, while the light is scattered (opaque) when they do not agree with each other. The light scattering property of the liquid crystal optical element is much higher than that of the DSM-LCD and display having a high contrast ratio can be obtained.

The major object of the present invention is to provide a liquid crystal optical element capable of providing-a high contrast ratio with a low driving voltage while reducing the image-sticking phenomenon due to the hysteresis of the liquid crystal/polymer composite material. The liquid crystal optical element can provide a bright display of high contrast and high density in combination of active elements. It also can provide a high performance in comparison with a conventional liquid crystal display element. Further, it effectively functions in another usage which requires a half-tone display (such as a window, a shutter, a display, a spatial light modulator and so on).

In the conventional liquid crystal/polymer composite material, there appeared hysteresis in the voltage-transmittance characteristics, this resulting a problem in displaying a gray-scale image. The hysteresis is a phenomenon that transmittance is different between the course of increasing the voltage applied and the course of decreasing of the voltage. If hysteresis exists, information in the previous display remains in the gray-scale image. Namely, image-sticking occurs which deteriorates the quality of picture image.

As one of the causes which produces hysteresis in the liquid crystal/polymer composite material, is the structure of the liquid crystal/polymer composite material wherein the liquid crystal is dispersed and held in the polymer phase or a plurality of domains is formed in a liquid crystal phase due to the existence of polymer. Namely, it is considered that there is the hysteresis caused by the interaction of the liquid crystal existing in a separate state in the polymer phase, and the interaction of the plurality of liquid crystal domains formed in the liquid crystal phase. The nature of the interaction between the polymer phase and the liquid crystal phase is different when the electric field is applied than when no electrical field exists. When no electrical field is applied, the interaction between the liquid crystal and the polymer is controlled by the surface tension which exists at the boundary. When an electrical field is applied, the interaction includes not only the boundary effects, but also the energy which is created by the rearrangement of the liquid crystal which occurs, i.e., the elastic energy.

The magnitude of the hysteresis is determined by an elastic energy stored in the dispersively held liquid crystal and the liquid crystal domains adjacent to each other, an electrical energy by an electric field applied from the outside, an energy by the interaction of the liquid crystal existing in a separated state in the polymer phase, and an energy by the interaction of the plurality of liquid crystal domains formed in the liquid crystal phase. Accordingly, the hysteresis can be reduced by optimizing the balance of energies, and an excellent display in which there is no image-sticking can be obtained even in a gray-scale display.

It is an object of the present invention to provide a liquid crystal optical element having a high contrast ratio, a high degree of brightness, quick response and capable of reducing hysteresis. Further, it is to provide a liquid crystal optical element which can be driven by an active element and a driving circuit of the low voltage type.

The polymer phase contributes to stabilize the arrangement of liquid crystal, to store elastic energy and to stabilize the entire structure of the liquid crystal/polymer composite material. Material for the polymer phase is optimized in consideration of the above points.

The most important factors on the electro-optical characteristics are the storing of elastic energy and the interaction between the liquid crystal and the polymer phase, i.e., surface tension at the liquid crystal-polymer boundary, which are closely related to the hysteresis on the voltage-transmittance characteristics of the liquid crystal/polymer composite material which is a cause of image-sticking of picture in a half-tone display, responding speed at a voltage variation time and reproducibility of the transmittance characteristics.

In particular, it is indispensable to minimize the hysteresis of the liquid crystal polymer composite material in order to obtain a fine half-tone display, which is an important factor. Further, since the polymer phase is related to the stabilization of individual liquid crystal particles or the liquid crystal domains or the stabilization of the entire structure of the liquid crystal/polymer composite material, it is required to determine the material of polymer phase in consideration of the surface tension with the liquid crystal and the elasticity of the polymer phase.

It is an object of the present invention to provide a liquid crystal optical element having a high contrast ratio, a high brightness and excellent responding characteristics and capable of reducing the hysteresis even under a condition that working temperature is substantially low.

Further, it is an object of the present invention to provide a liquid crystal optical element in which active elements and driving circuits used for a conventional TN-LCD can be employed.

The polymer phase functions to stabilize the arrangement of liquid crystal; to store the elastic energy, to stabilize the structure of the entirety of the liquid crystal/polymer composite material, surface tension with the liquid crystal and so on. In consideration of these points of performance, the most preferable material is selected for the polymer phase. Among the points of performance, the storing of elastic energy and the surface tension with the liquid crystal are important to obtain preferable electro-optical characteristics, which are closely related to the hysteresis on the voltage-transmittance characteristics of the liquid crystal/polymer composite material which is a cause of generating the image-sticking as a problem in a half-tone display, the responding characteristics at the time of voltage variation, reproducibility of the transmittance characteristics and so on.

In particular, to eliminate the hysteresis in the liquid crystal/polymer composite material is indispensable in order to obtain a fine half-tone display, and it is an important parameter. Further, material for the polymer phase is related to the stability of the liquid crystal phases in a phase separation state and the stability of the structure of the entirety of the liquid crystal/polymer composite material. Accordingly, it is necessary to select the material for the polymer phase in consideration of the contacting energy to the liquid crystal and the elasticity.

In consideration of the above, the curable material for forming the polymer phase used in the present invention should include an addition-polymerizable urethane compound obtained from an aliphatic isocyanate compound having a side chain, i.e., a monofunctional or polyfunctional isocyanate containing at least one tertiary or quaternary carbon in its molecule and containing no aromatic or saturated ring in its molecule.

When a cured product of a curable material comprising an addition-polymerizable urethane compound obtained from an aliphatic isocyanate compound having a side chain is used as the polymer phase, a well-balanced performance of the elastic characteristic of the matrix, the surface tension with the liquid crystal and so on, which constitute the condition to obtain the optical characteristics suitable for a half-tone display or a dynamic display, can be obtained.

Further, the free volume of a polymer chain is an important factor to change the elasticity of the polymer phase and the surface tension with the liquid crystal. The above-mentioned conventional technique 4 discloses that the reduction of the elasticity of the polymer phase is effective for reducing the hysteresis. Further, the conventional technique 1 discloses that an oligomer having an urethane bond having an appropriate polarity to the liquid crystal should be contained in a part of the polymer phase, in order to control the surface tension with the liquid crystal.

In order to obtain a liquid crystal/polymer composite material having minimized hysteresis and suitable for a half-tone display, the polymer phase should not include an aromatic ring which reduces the free volume of the molecular chain and increases the elasticity. It may include a saturated carbon-hydrogen ring. However, when it includes an excessive amount of the saturated carbon hydrogen ring, there is a possibility of reducing the physical properties in the same manner as the aromatic ring.

On the other hand, in a cured product comprising an addition-polymerizable urethane compound obtained from only an isocyanate compound having a completely linear chain, i.e. having no side chain and no branched structure, the crystallizability is high, and it is difficult to control the surface tension between the polymer and the liquid crystal. Accordingly, in the liquid crystal/polymer composite material having such a structure that the polymer phase and the liquid crystal are phase-separated in a three-dimension space, it is difficult to satisfy requirements of a high contrast ratio and a small hysteresis.

Accordingly, the liquid crystal/polymer composite material should have a polymer phase comprising an addition-polymerizable urethane compound obtained from an aliphatic isocyanate compound having a side chain so that the free volume of the polymer phase is not reduced and the crystallizability of the polymer can be reduced.

In the present invention, as the isocyanate compound, an aliphatic isocyanate compound having a side chain may be used alone, or it may be used in combination with a linear aliphatic isocyanate or an alicyclic isocyanate compound. The isocyanate compound having a side chain is preferably used in an amount of at least about 10 mol %, preferably 50 mol %, based on the total isocyanate compounds.

The side chain of the aliphatic isocyanate compound having a side chain may, for example, be an alkyl group, or a side chain having an ester bond, such as an alkyloxycarbonyl group or an isocyanatoalkyloxycarbonyl group. Further, it may be a side chain having an ether bond or a carbonate bond. As such an isocyanate compound, a diisocyanate compound is preferred, but a monoisocyanate compound or a tri- or higher functional polyisocyanate compound may also be employed.

The following compounds may, for example, be mentioned as specific isocyanate compounds having side chains: 2,2,4-trimethyl-1,6-diisocyanatohexane, 2,4,4-trimethyl-1,6-diisocyanatohexane, 1,5-diisocyanato-2-methylpentane lisine diisocyanate, 1,8-diisocyanato-4-isocyanatomethyloctane, and lisine ester triisocyanate. Particularly preferred isocyanate compounds are 2,2,4-trimethyl-1,6-diisocyanatohexane, 2,4,4-trimethyl-1,6-diisocyanatohexane and a mixture thereof. A mixture of these two compounds in a weight ratio of about 1:1, is commercially available, and such a commercial product can be used.

As mentioned above, the above isocyanate compound may be used in combination with other isocyanate compounds. As the isocyanate compounds to be used in combination, a linear aliphatic isocyanate compound and an alicyclic isocyanate compound are preferred. In some cases, a small amount of a non-yellowing aromatic isocyanate compound may also be used, and such a compound is preferably a diisocyanate compound.

The following specific compounds may, for example, be mentioned as such other isocyanate compounds: hexamethylene diisocyanate, isophorone diisocyanate, 4,4-dicyclohexylmethane diisocyanate, bis-isocyanatomethylcyclohexane, xylene diisocyanate, tetramethylxylene diisocyanate, and 1,3,6-hexamethylene triisocyanate.

The addition-polymerizable urethane compound is preferably a compound obtained by the reaction of the above isocyanate compound, a polyol and an addition-polymerizable compound having a reactive group. However, it is not limited thereto and may, for example, be a compound obtained by the reaction of a polyol or monool having an addition-polymerizable group with the above isocyanate compound. The addition-polymerizable compound having a reactive group is preferably the one having a group reactive with an isocyanate group, such as a hydroxyl group.

As the addition-polymerizable group in the addition-polymerizable compound having a reactive group, an acryloyl group, a methacryloyl group, a vinyl group, an allyl group, a maleic acid residue, an epoxy group or a thiol group may, for example, be mentioned. To carry out the addition-polymerization by light rays such as ultraviolet rays, an acryloyl group is most preferred. In a case where a heat setting type compound is to be used, other addition-polymerizable groups may be employed. In the present invention, a photocurable type compound is preferred. Accordingly, a case wherein an acryloyl group is employed as the addition-polymerizable group, will be described.

As the polyol, a polyol such as a polyether polyol, a polyester polyol, a polycarbonate polyol or a polybutadiene polyol, may, for example, be used. A silicone type polyol having a diorgano polysiloxane chain such as a dimethylpolysiloxane chain, or other polyols, may also be used. Preferably, a polyether polyol or a polyester polyol is used. It is particularly preferred to use a polyol which is capable of forming a resin matrix having a relatively low modulus of elasticity. As such a polyol, a polyol having a side chain-containing backbone chain structure may be mentioned.

The polyol is preferably a polyether polyol having a relatively high molecular weight, such as polypropylene glycol, polybutylene glycol, polyethylene glycol, poly(oxypropylene/oxyethylene) glycol, polyoxytetramethylene glycol, tri- or higher functional polyoxypropylene polyol, or tri- or higher functional poly(oxypropylene/oxyethylene) polyol. Particularly preferred is a polyether polyol containing oxypropylene groups as repeating units, such as polypropylene glycol. The polyether polyol having oxypropylene groups is a kind of polyols having side chain-containing backbone chain structures.

The addition-polymerizable compound having a reactive group is preferably a compound having a hydroxyl group and an acryloyl group, as mentioned above. Most preferred is a hydroxyl group-containing acrylate. For example, a monoester of a dihydric alcohol with acrylic acid, such as 2-hydroxyethyl acrylate or 2-hydroxypropyl acrylate, is preferred.

Further, an acrylate having two or more hydroxyl groups, such as glycerol monoacrylate or pentaerythritol monoacrylate, or a polyfunctional acrylate having a hydroxyl group, such as triglycerol diacrylate or pentaerythritol diacrylate, may, for example, be also used. Furthermore, a partial acrylate of a polyol having repeating units of e.g. dipropylene glycol, tripropylene glycol or diglycerol, may also be used.

The addition-polymerizable urethane compound in the present invention is preferably a reaction product of the above-described isocyanate compound, the polyol and the hydroxyl group-containing acrylate. Each of such three types of starting materials may be a combination of two or more compounds. The proportions for the reaction are not particularly limited so long as it is possible to obtain an addition polymerizable urethane compound having at least one acryloyl group (hereinafter sometimes referred to as an acrylurethane compound). It is usual to employ the isocyanate compound in a stoichiometrical amount to the total equivalent of the polyol and the hydroxyl group-containing acrylate. If the equivalent amount of the polyol to the isocyanate compound is close to 1, a high molecular weight product is likely to form, and the viscosity of the product tends to be high.

Preferably, n mol of the isocyanate compound is used per mol of the polyol having n hydroxyl groups. Further, the hydroxyl group-containing acrylate is used in such a proportion that the hydroxyl groups will be an equivalent amount to the rest of isocyanate groups. For example, 2 mol of a diisocyanate compound and 2 mol of 2-hydroxyethyl acrylate are used per mol of polyether diol.

The isocyanate compound, the polyol and the hydroxyl group-containing acrylate may be reacted at the same time. Otherwise, the isocyanate compound may preliminarily be reacted with the polyol or the hydroxyl group-containing acrylate to obtain an isocyanate group-containing reaction product, and then the remaining compound may be reacted thereto. For example, the isocyanate compound and the polyol may be reacted to obtain an isocyanate group-containing prepolymer, and the hydroxyl group-containing acrylate may be reacted thereto to obtain an acrylurethane compound.

The resulting acrylurethane compound is usually an acrylurethane compound having two or more acryloyl groups, i.e. a polyfunctional acrylurethane compound. However, a part of the hydroxyl group-containing acrylate may be substituted by a saturated alcohol, and then the reaction may be carried out to obtain a monofunctional acrylurethane compound.

Further, using a monool having a relatively high molecular weight (such as a polyether monool) instead of the polyol, a monofunctional acrylurethane compound may be prepared by reacting it with the isocyanate compound and the hydroxyl group-containing acrylate. The molecular weight of the acrylurethane compound in the present invention is preferably from 500 to 50000.

Now, examples of the specific acrylurethane compound in the present invention are shown by their chemical structures. However, the specific acrylurethane compound is not limited to such examples. Particularly preferred is a compound of the formula (3) (wherein m is 1).

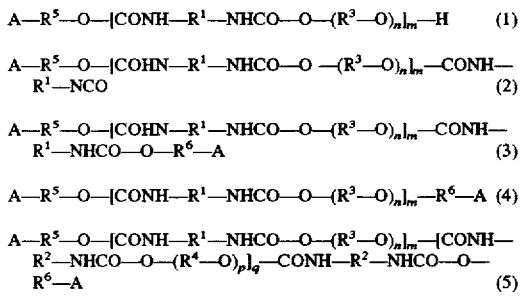

In the formulas (1) to (5), A, $R^1$ to $R^7$, m, n, p and q are as follows.

A: Acryloxy group.

$R^1$: Residue having isocyanate groups removed from an aliphatic diisocyanate compound having a side chain.

$R^2$: Residue having isocyanate groups removed from a diisocyanate compound other than the aliphatic diisocyanate compound having a side chain.

$R^3$ and $R^4$: Each independently represents a $C_{2-4}$ alkylene group.

$R^5$ and $R^6$: $C_{2-8}$ alkyl group.

m: An integer of at least 1 (provided that in the formulas (2) and (3), m may be 0).

n and p: An integer of at least 2.

q: An integer of at least 0

In the present invention, the curable material comprising an acrylurethane compound may be a mixture of an acrylurethane compound with other addition-polymerizable compounds. As such other addition polymerizable compounds, various acrylates having no urethane bond, and an acrylurethane compound obtained by using an isocyanate compound other than the aliphatic isocyanate compound having a side chain, may, for example, be mentioned. As the latter acrylurethane compound, an acrylurethane compound obtained by using the same material as mentioned above except for the difference in the isocyanate compound, may be mentioned.

As the isocyanate compound, an aliphatic isocyanate compound or an alicyclic isocyanate compound, having no side chain, as mentioned above, is preferred. When such an acrylurethane compound is employed, the amount is preferably at most ⅔, more preferably at most ½, based on the total weight of such an acrylurethane compound and the specific acrylurethane compound in the present invention.

As various acrylates having no urethane bond, an alkyl acrylate, a hydroxyl group-containing acrylate, an acrylate of a polyhydric alcohol (having no hydroxyl group), and an acrylate having a relatively high molecular weight, may, for example, be used. Such acrylates may be monofunctional or polyfunctional. The number of functional groups is preferably from 1 to 10, more preferably from 1 to 6.

As the alkyl acrylate, an alkyl acrylate wherein the carbon number of the alkyl group is at most 20, such as ethyl acrylate, isopropyl acrylate or 2-ethylhexyl acrylate, is preferred. As the hydroxyl group-containing acrylate, a hydroxyl group-containing acrylate mentioned as the starting material of the above acrylurethane compound, may be used.

As the acrylate of a polyhydric alcohol, ethylene glycol diacrylate or dipropylene glycol diacrylate may, for example, be mentioned. As the acrylate having a relatively high molecular weight, an ester of acrylic acid with the above-mentioned polyol having a relatively high molecular weight, may be employed. These various acrylates may be used in combination as a mixture of two or more of them.

Particularly preferred as the above-mentioned acrylurethane compounds or various acrylates are relatively high molecular weight acrylurethane compounds, acryl acrylates and hydroxylalkyl acrylates having molecular weights of the same level as the above-described specific acrylurethane compound.

In addition to the above-mentioned acrylurethane compounds and acrylates having no urethane compounds, still other addition-polymerizable compounds may be used as a component for the curable material. For example, acrylic acid, acrylamide, other compounds having acryloxy groups, compounds having methacryloxy groups such as methacrylates, vinyl compounds such as vinyl esters or styrenes, and unsaturated polyesters, may, for example, be mentioned. However, compounds other than the compounds having acryloxy groups, have no good photopolymerizability. Accordingly, as the addition-polymerizable compound for the curable material in the present invention, a compound having an acryloxy group, such as an acrylurethane compound or acrylate, is preferred.

The addition-polymerizable compound in the curable material in the present invention may be composed solely of the above-mentioned specific acrylurethane compound, but preferably further contains the above-described other addition-polymerizable compounds, particularly other acrylurethane compounds or acrylates. It is particularly preferred to incorporate an acrylate having a low molecular weight as compared with the specific acrylurethane compound, with a view to controlling the compatibility to liquid crystals, improving the uniformity of the phase-separated structure after curing and controlling the fraction of the phase-separated liquid crystal phase. The difference in the molecular weight between the two is preferably at least 1.5 times.

Further, to carry out the compatibility control accurately, it is preferred to use, as the low molecular weight acrylate, a hydroxyl group-containing acrylate, or a combination of a hydroxyl group-containing acrylate and an acrylate containing no hydroxyl group. Further, a part of the specific acrylurethane compound may preferably be substituted by other acrylurethane compound having a relatively high molecular weight. It is particularly preferred to use a hydroxyalkyl acrylate, or a combination of a hydroxyalkyl acrylate and an alkyl acrylate.

The amount of the specific acrylurethane compound, based on the total addition-polymerizable compounds in the curable material, is preferably at least 10 wt %, more preferably from 20 to 80 wt %. When an acrylurethane compound other than the specific acrylurethane compound, is used in combination, the amount is preferably at most twice by weight, more preferably at most equal by weight, to the specific acrylurethane compound. The relatively low molecular weight acrylate such as a hydroxyl group-containing acrylate or no hydroxyl group-containing acrylate, is preferably used in combination with the specific acrylurethane compound, as mentioned above, and is preferably used in an amount of at least 10 wt %, more preferably from 20 to 80 wt %, based on the total addition-polymerizable compounds.

Into the curable material, in addition to the addition-polymerizable compound and the liquid crystal, other additives may be incorporated. Particularly, it is common to incorporate a polymerization initiator to cure the addition polymerizable compound. As such a polymerization initiator, a photopolymerization initiator is preferred to carry out curing by photopolymerization. Further, a viscosity-regulating agent, a spacer such as alumina particles or glass fibers and other additives may be incorporated.

Liquid crystal to be incorporated into the curable material may be a nematic liquid crystal or a smectic liquid crystal. In particular, the nematic liquid crystal is preferably used. Further, a cholesteric liquid crystal may be added, or a dichroic dye or a single coloring matter may be added. The liquid crystal is preferably used in an amount of 35–90 wt %, in particular 60–80 wt %, based on the total amount of the mixture comprising the liquid crystal and the curable material. The relative ratio of the liquid crystal to the cured product will be described hereinafter.

In order to increase the scattering characteristics in a non-electric field application state to obtain a high contrast ratio, the refractive index anisotropy $\Delta n$ of the liquid crystal should be $0.18 \leq \Delta n$, more preferably $0.20 \leq \Delta n$.

In the present invention, the transmittance in the light transmission state is preferably increased by rendering the refractive index of the liquid crystal to be in agreement with that of the polymer phase at the voltage application time. For this, a nematic liquid crystal having a positive dielectric anisotropy is used so that $n_o$ of the liquid crystal is substantially in agreement with the refractive index of the polymer phase. Then, a high transparent state is obtainable at the time of applying a voltage. Specifically, it is preferable to satisfy the relation of $n_o - 0.03 < n_p < n_o + 0.05$.

In the present invention, the liquid crystal should be uniformly dissolved in the curable material. A cured product after the polymerization of the curable material is not dissolved or is hardly dissolved. When a composition of liquid crystal is used, it is desirable to use the elements of liquid crystal each having a closer value in solubility.

It is preferable to cure the curable material including liquid crystal by light, in particular, ultraviolet rays since a photosetting method gives less adverse effect to the liquid crystal; can cure the curable material quickly, and provides excellent phase separation property in comparison with another curing method such as a thermosetting method. In curing the curable material with use of light, it is unnecessary to evaporate solvent or water which is useless at the time of curing. Since the photosetting method allows a curing treatment in a closed system, a conventional injection method can be employed to the cell to increase reliability. Further, when the photosetting material is used, two substrates are bonded to each other, which further increases reliability.

In the present invention, since the liquid crystal/polymer composite material is used, a possibility that the upper and lower transparent electrodes may short-circuit can be reduced, and it is unnecessary to strictly control the orientation of the liquid crystal and the substrate gap as required for the conventional TN type display element. Accordingly, the liquid crystal optical element capable of controlling a transparent state and a scattering state can be effectively produced.

As a concrete producing method, there is a technique that the above-mentioned curable material and liquid crystal are uniformly dissolved, and the curable material is cured to form a phase-separated structure of the liquid crystal and the polymer phase. In this case, the balance of compatibility of the system before and after the curing and the characteristics of the polymer phase can be controlled by appropriately incorporating another curable compound, a reaction initiator and so on.

In the structure of the liquid crystal/polymer composite material in which the polymer phase and the liquid phase are phase-separated in a three-dimensional space, it is preferable for the liquid crystal/polymer composite material to have such a structure that phase separation of polymer phase is caused to have a three-dimensional network structure in a continuously formed liquid crystal phase. Because it is effective to satisfy a high scattering performance and a high transmission when the element is driven with a low voltage. Scattering is due to the existence of the interfaces between the liquid crystal domains and at the boundary between the liquid crystal and the polymer phases. Accordingly, scattering performance can be improved by increasing the surface area of the interface between the liquid crystal and the polymer phases and by increasing the number of the liquid crystal domains existing in the liquid crystal phase.

In order to maintain the optimum average size of the liquid crystal domains and to increase the surface area of the domain interfaces for contributing to the scattering performance, it is important to increase the amount of liquid crystal which is separated into the separate liquid crystal phase at the phase-separation time, i.e., during polymerization, and to create the shape of the polymer phase so as to produce a large number of liquid crystal domains in the interconnected or continuous liquid crystal phase. Accordingly, it is preferable that the phase-separated polymer has a three-dimensional network structure by which a large number of liquid crystal domains are induced in the continuous liquid crystal phase, hence, the interface between the liquid crystal domains is increased, whereby the liquid crystal/polymer composite material can provide a high scattering performance.

Further, in order to reduce the driving voltage, it is important that the respective liquid crystal domains held in the polymer phase have a substantially equal driving electric field. For this, the interface between the liquid crystal domains should be constant after the driving electric field has been removed. If the interface is not constant, there causes substantial dispersion of the driving electric field which is apt to reduce the contrast ratio and increase the driving voltage. Accordingly, the polarity of the polymer phase derived from the molecular structure and the separation speed at the phase-separation time should be controlled so as to form such a structure that the polymer phase holding the connected or communicated liquid crystal phase provides a constant interface between the plurality of liquid crystal domains in the liquid crystal phase.

In the above explanation, use of a single liquid crystal optical element, i.e. a single plate system, has been explained. However, when three liquid crystal display elements are used for a projection type liquid crystal display apparatus wherein three kinds of light (R, G and B) are caused to pass through each liquid crystal display element, the characteristics of each of the liquid crystal elements should be uniformly adjusted for each color by adjusting the averaged size of the liquid crystal domains, the inter-substrate gap, the refractive index of the liquid crystal and so on.

In order to improve the scattering property when no electric field is applied, it is effective to increase the volume fraction $\Phi$ of the liquid crystal which is operable in the liquid crystal/polymer composite material. In order to obtain higher scattering property, it is preferable that $\Phi > 35\%$, more preferably $\Phi > 45\%$. On the other hand, when the value $\Phi$ is excessively high, the stability in structure of the liquid crystal/polymer composite material becomes inferior. Accordingly, it is preferable that $\Phi < 90\%$. When a completely communicated state which is near the most compact structure is desired, a content of liquid crystal in a mixture comprising a non-cured liquid crystal and a curable material should be in a range between about 60 wt % and about 80 wt %.

In the liquid crystal optical element of the present invention, it is preferable that no of the liquid crystal used substantially coincides with the refractive index of the polymer phase. In this case, a scattering state (i.e., an opaque state) is shown due to a difference in refractive index of the respective interfaces between the liquid crystal domains which are oriented in different directions and between the polymer phase and the liquid phase when no electric field is applied. Accordingly, light is scattered by a portion of the liquid crystal optical element at which no electrode is located.

When the liquid crystal optical element is used for a projection type display apparatus, light is scattered in the portion other than picture elements. Accordingly, the portion looks dark in a display because light dose not reach a projection screen even when a light shielding layer is not provided at said portion. In order to prevent light from leaking from any other portion of the liquid crystal optical element than the picture element electrodes, a light shielding layer should be provided at the portion other than the picture element electrodes and TFTs whereby spaces between the picture element electrodes clearly indicate a black tone.

An electric field is applied to a desired picture element in the liquid crystal optical element of the present invention. At the picture element portion to which the electric field is applied, the liquid crystal is oriented so that $n_o$ of the liquid crystal and the refractive index ($n_p$) of the polymer matrix coincide with each other. Accordingly, the liquid crystal display element presents a transparent state, and light is transmitted through the desired picture element to thereby provide a bright display on a projection screen.

If the curable compound is cured during the curing step while a sufficiently high voltage is applied only to a specified portion of the element, the portion is formed to have a normally light transparent state. Accordingly, in a case that there is to form a fixedly display portion, such a normally transparent portion may be formed.

In the liquid crystal display element of the present invention, a colored display can be attained by providing a color filter. Color filters having different three colors may be provided in a single liquid crystal display element, or a color filter for a specified color may be provided in a single liquid crystal display element and three liquid crystal display elements having different color filters may be used in combination. The color filter may be provided on the surface having electrodes of the substrate or may be provided at the outer side of the substrate.

Further, dye, pigment or the like may be mixed into the liquid crystal/polymer composite material to effect a color display.

Figure 2:
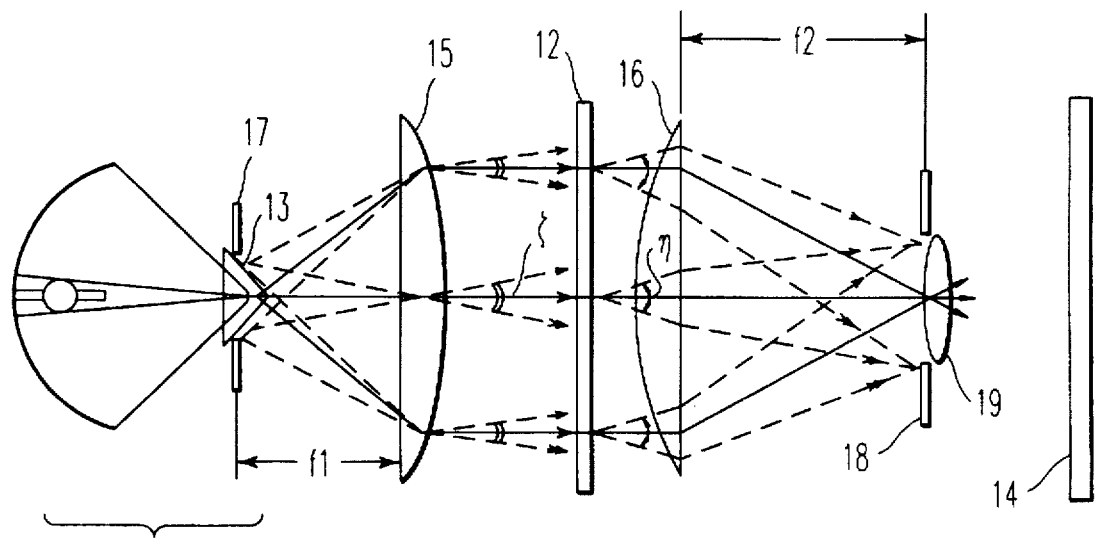

In drawings:

FIG. 1 is a cross-sectional view of an embodiment of the liquid crystal optical element of the present invention; and FIG. 2 is a block diagram of an embodiment of the projection type liquid crystal display apparatus according to the present invention.

Preferred embodiments of the liquid crystal optical element, the method for producing the same and the projection type liquid crystal display apparatus of the present invention will be described with reference to the drawings.

FIG. 1 is a cross-sectional view showing an embodiment of the liquid crystal optical element of the present invention in which an active matrix substrate is used.

In FIG. 1, reference numeral 1 designates a liquid crystal optical element, numeral 2 designates a substrate such as glass, plastics or the like which is used as an active matrix substrate, numeral 3 designates a picture element electrode such as ITO ($In_2O_3$—$SnO_2$), $SnO_2$ or the like, numeral 4 designates an active element such as a transistor, a diode, a non-linear resistance element or the like, numeral 5 designates a substrate such as glass, plastics or the like which is used as a counter electrode substrate, numeral 6 designates a counter electrode such as ITO, $SnO_2$ or the like, and numeral 7 designates a liquid crystal/polymer composite material interposed between the substrates.

FIG. 2 is a diagram showing an embodiment of the projection type liquid crystal display apparatus in which the liquid display optical element as shown in FIG. 1 is used.

In FIG. 2, reference numeral 11 designates a light source system, numeral 12 designates a liquid crystal optical element, numeral 18 designates a second aperture, numeral 19 designates a projection optical system such as a lens, and numeral 14 designates a projection screen.

In a case of using a three-terminal element such as TFT as the active element, a solid electrode used in common with all picture elements may be disposed on the counter electrode substrate. In a case of using a two-terminal element such as an MIM element or a PIN diode or the like, the counter electrode substrate is applied with a stripe-like patterning.

In the case of using TFT as the active element, silicon is suitable as a semiconductor material. Polycrystalline silicon is particularly preferred since it has less photosensitivity in comparing with amorphous silicon, and there is less possibility of erroneous operation. In the case of using polycrystalline silicon for the projection type liquid crystal display apparatus in the present invention, a stronger light source for projection can be utilized and a bright display is obtainable.

In this case, it is preferable to use a liquid crystal/polymer composite material wherein the refractive index of a polymer phase substantially agrees with $n_o$ of liquid crystal used. With such material, in principle, light is scattered at a portion to which an electric field is not applied, and the portion looks dark on a projection screen on which the light is projected. On the other hand, use of the polycrystalline silicon as an active element preferably reduces the effect of light to the active element. Further, a light shielding film may be provided at only the portion of the active element.

Use of the amorphous silicon is possible if the light shielding film is formed at a portion of semiconductor. As the electrode used, a transparent electrode is generally used. However, when a reflection type liquid crystal display apparatus is to be produced, a reflection electrode of a material such as chromium, aluminum or the like may be used.

In the case of conventional TN-LCD, a light shielding film is often formed between picture elements so as to reduce the leakage of light from the portion between the picture elements. Similarly, a light shielding film may be formed in the space between the picture elements in the liquid crystal optical element of the present invention and a light shielding film may be formed at the portion of active element.

In the liquid crystal optical element of the present invention, an infrared ray cut filter or UV-ray cut filter or the like may be used in a lamination form, or characters, figures or the like may be printed, or a plurality of liquid crystal optical elements may be used.

Further, in the present invention, a protective plate such as a glass plate, a plastic plate or the like may be overlaid at the outside of the liquid crystal optical element. The protective plate reduces a danger of breakage of the optical element even when the surface of the element is pushed, whereby the safety of the optical element is improved.

The projection light source, the projection optical system, the projection screen and so on used in the present invention may be a conventionally used light source, projection optical system, projection screen and so on. In the present invention, the liquid crystal display element is disposed between the projection light source and the projection optical system. The projection optical system may be used so that images from the plurality of the liquid crystal display elements are synthesized with use of an optical system and the synthesized image is displayed. Further, a cooling system may be added, or a TV channel display device such as LED or the like may be added.

In particular, when a projection type display is to be shown, a device for reducing diffusion light, e.g. an aperture or a spot as indicated by numeral 15 in FIG. 2 may be disposed on the optical path so that the contrast ratio of display can further be increased. Namely, as the device for reducing diffusion light, it is preferred to use such a device that among incident light passing through the liquid crystal optical element, straight-forward light (light which has transmitted through portions in which the picture element portions are in a transparent state) is taken, and non-straight-forward light (light scattered at portions in which the light crystal/polymer composite material is in a scattering state) is diminished. In particular, the device which does not reduce the straight-forward light but reduces diffusion light is preferred.

Specifically, as shown in the block diagram of FIG. 2, the projection type liquid crystal display apparatus is provided with a light source system 11 (comprising a light source, an elliptic mirror, a convex lens 13 and a first aperture 17), a liquid crystal display element 12, a first lens 15 (a light-paralleling lens), a second lens 16 and a projection optical system (comprising a second aperture 18 and a projection lens 19). The light source system 11 emits light beams having good directivity.

In the operation of the apparatus, light emitted from the projection light source passes through the liquid crystal display element 12. Among the light passing through the display element 12, straight-forward light in the incident light is collected by the second lens 16; the collected light is passed through the second aperture 18 and the projection lens 19 and is projected on a projection screen. On the other hand, light which is not straight forward and scatters at the liquid crystal display element 12 does not pass through the second aperture 18 comprising an aperture or a spot even though it is collected by the focussing lens 16. Accordingly, scattered light is not projected, and the contrast ratio can be improved.

As another embodiment, a mirror having a small surface area is arranged obliquely at the same position, instead of the aperture or the spot. Light reflected by the mirror is projected through a projection lens disposed on the optical axis of the mirror. Further, a spot or mirror or the like may be disposed at a position where light beams are focused by a projection lens, without using the focussing lens. The focal length or the diameter of the projection lens may be suitably selected so as to remove scattering light, without using an especially arranged aperture.

Further, a microlens system can be used. Specifically, a combination of a microlens array and a spot array in which fine holes are formed in array may be disposed at the side of the projection optical system with respect to the liquid crystal display element to thereby remove needless scattering light. This arrangement has an advantage of reducing the entire size of the projection type display apparatus because the optical path length necessary for removing scattering light can be remarkably shortened. In order to reduce the optical path length, the installation of a scattering light removing system in the projection optical system is effective way. The structure of projection type display apparatus in which the scattering light removing system is installed in the projection optical system is simpler than the structure in which the projection optical system and the scattering light removing system are independently disposed, whereby the entire size of the apparatus can be reduced.

These systems may be used in combination with a mirror, a dichroic mirror, a prism, a dichroic prism, a lens and so on to synthesize a picture image and to display a colored image. Further, a colored picture image is obtainable by combining the optical system with a color filter.

The ratio of the scattered light component to the straight-forward light component reaching on the projection screen can be controlled by adjusting the diameter of the spot or the mirror and the focal length of the lens, so that a desired contrast ratio of display and the brightness in display can be obtained.

When the apparatus for reducing diffusion light as shown in FIG. 2 is used, light entering from the projection light source to the liquid crystal display element should be parallel in order to increase the brightness of display. For this, it is preferable to constitute a projection light source by combining a light source capable of providing high brightness (which should be a point light source), a concave mirror, a condenser lens and so on.

Description has been made mainly as to the transparent type display apparatus. However, the present invention is applicable to a projection type liquid crystal display apparatus having a structure of reflection type. For instance, a small mirror is disposed, instead of a spot, to take out only necessary light.

In the following, the present invention will be described more in detail in connection with various examples.

EXAMPLE 1

A mixture of equal amounts by weight of 2,2,4-trimethyl-1,6-diisocyanatohexane and 2,4,4-trimethyl-1,6-diisocyanatohexane (hereinafter referred to as TMDI), polypropylene glycol (hereinafter referred to as PPG) having a molecular weight of 1000 and 2-hydroxyethyl acrylate (hereinafter referred to as HEA) were reacted in a molar ratio of 2:1:2 to obtain an acrylurethane compound. This acrylurethane compound will be hereinafter referred to as acrylurethane (A).

To a mixture of the acrylurethane (A), 2-ethylhexylacrylate (hereinafter referred to as EHA) and HEA in a weight ratio of 20:7:13, a nematic liquid crystal ($\Delta n=0.22$, $\Delta\epsilon=12$, $K33=13\times10^{-12}N$, $\eta=25$ cSt) and a small amount of photopolymerization initiator were added to prepare a uniform composition having a liquid crystal content of 65 wt %.

An active matrix substrate having a polycrystal silicon TFT for each picture element and a counter electrode substrate on which a solid electrode was formed were sealed at their peripheral portions with use of a sealing material to thereby prepare a cell having an electrode substrate gap of 10 μm.

The above-mentioned mixture in an uncured state was injected to the cell, and it was exposed to UV rays to cure the mixture to thereby form a liquid crystal/polymer composite material. A liquid crystal display element was prepared by combining a liquid crystal optical element having the liquid crystal/polymer composite material and a driving circuit.

Further, the liquid crystal display element was combined with a projection light source and a projection optical system to prepare a projection type display apparatus. When a picture image was projected on the screen by irradiating light beams of 700,000 luxes from the projection light source in a room at a room temperature of 15° C., the contrast ratio on the screen was about 110. At the same time, the temperature of the liquid crystal optical element was measured and it was found that the temperature in average was 24° C.

When the liquid crystal optical element was driven by video signals, a dynamic picture image substantially free from image-sticking was obtained even at the time of switching picture images. The transmittance in the picture element portion of the liquid crystal optical element which was driven with 7 volts, was 73%. In this case, the collection cone angle of the projection optical system was 5° in the total angle.

EXAMPLE 2

PPG having a molecular weight of 1000, isophorone diisocyanate and HEA were reacted in a molar ratio of 1:2:2 to obtain a reaction product, which will be hereinafter referred to as acrylurethane (B). To a mixture of this acrylurethane (B) and acrylurethane (A) in a weight ratio of 1:1, EHA and HEA were added to obtain a mixture. The weight ratio of (A):(B):EHA:HEA was 10:10:7:13. To this mixture, the same liquid crystal and photopolymerization initiator as used in Example 1 were mixed to obtain a composition having a liquid crystal content of 65 wt %. Using this composition, a liquid crystal optical element was prepared in the same manner as in Example 1.

Comparative Example 1

PPG having a molecular weight of 1000, 4,4'-dicyclohexylmethane diisocyanate and HEA were reacted in a molar ratio of 1:2:2 to obtain a reaction product, which will be hereinafter referred to as acrylurethane (C). A liquid crystal optical element was prepared by using the same materials under the same conditions as in Example 1 except that this acrylurethane (C) was used instead of acrylurethane (A).

Comparative Example 2

PPG having a molecular weight of 1000, 1,6-hexamethylene diisocyanate and HEA were reacted in a molar ratio of 1:2:2 to obtain a reaction product, which will be hereinafter referred to as acrylurethane (D). A liquid crystal optical element was prepared by using the same materials under the same conditions as in Example 1 except that this acrylurethane (D) was used instead of acrylurethane (A).

The same projection test as in Example 1 was conducted by using the liquid crystal optical elements prepared according to Example 2 and Comparative Examples 1 and 2. In this case, the temperature in average of the liquid crystal optical elements was 24° C.–25° C. in all the cases.

Evaluation on image-sticking at the time of switching picture images in a case that a dynamic picture was displayed by driving these liquid crystal display elements by video signals, is shown in Table 1. Table 1 also indicates the transmittance of the picture element portion of the liquid crystal display elements when they are driven with 7 volts. In any case, the collection cone angle of the projection optical system was 5° in the total angle. Further, the dispersion angle of light incident to the liquid crystal optical elements was 5° or less.

TABLE 1

| Example | Transmittance | Sticking | Contrast ratio |
|---|---|---|---|
| Example 1 | 73% | No | 110 |
| Example 2 | 71% | No | 110 |
| Comparative Example 1 | 7% | Yes | 10 |
| Comparative Example 2 | 68% | Yes | 60 |

Ambient temperature $T_a = 15°$ C.

In the liquid crystal optical element of the present invention, a liquid crystal/polymer composite material which electrically controls a scattering state and a transparent state is used as a liquid crystal material, and the liquid crystal/polymer composite material is held between a pair of substrates with electrodes to thereby form the liquid crystal optical element. Since the structure of the liquid crystal/polymer composite material can be controlled in extremely precise and stable manners, the scattering property can be remarkably improved without reducing the transmittance of light. Therefore, the liquid crystal/polymer composite material excellent in the optical characteristics can be formed. Namely, a spatial structure wherein a polymer phase having a three-dimensional network structure is formed by phase separation in a continuous liquid crystal phase, can be formed.

Further, selection of the polymer phase provides a desired shape of polymer phase before and after the phase separation by polymerization. In particular, when the phase separation by photopolymerization is used, a stable compatibility of a mixture of liquid crystal and a curable material is obtainable, and the injection of the liquid crystal into an empty cell and the curing step by photo-irradiation can be conducted in a stable manner.

Further, the liquid crystal/polymer composite material formed can have a desired fine structure which exhibits excellent electro-optical characteristics. This is because interaction between the liquid crystal layer and the polymer phase at their interface at the time of phase separation is suitably adjusted by the elasticity and the polarity of the polymer phase which derives from the molecular structure of it.

Further, the hysteresis of the liquid crystal/polymer composite material can be reduced in a wide temperature range (in the conventional technique, it was difficult to reduce the hysteresis in a lower temperature range than the normal temperature). As a result, a projection type liquid crystal display apparatus having a clear half-tone display can be obtained without resulting an image-sticking phenomenon. Specifically, in a projection type liquid crystal display apparatus in which light beams of about 500,000 luxes are irradiated to the liquid crystal display element, excellent working characteristics can be obtained in an ambient temperature range of +15° C.–+40° C.

Further, the liquid crystal optical element of the present invention has a high contrast ratio and provides a display of high brightness even when a conventional driving IC for a TN-LCD is used.

Further, it is possible to obtain a gray scale display having a clear half tone when gray scale driving is conducted, and to reduce an image-sticking phenomenon due to the hysteresis.

Accordingly, the liquid crystal optical element of the present invention is effective for a projection type display for obtaining a picture image of high brightness, and provides a projection type display having brightness, an excellent contrast ratio and free from image-sticking. Further, it is possible to reduce the size of a light source to be used.

Further, since it is unnecessary to use a polarization plate, the liquid crystal optical element has less wavelength dependence to the optical characteristics, and there is little requirement for color correction for the light source. Further, possible problems of orientation processing such as rubbing necessary for the TN-LCD and destruction of the active elements due to static electricity resulted from the orientation processing can be avoided, and yield of production of liquid crystal optical elements can be improved significantly.

Since the liquid crystal/polymer composite material is formed in a film state after curing, such problems of short-circuiting between the substrates due to a pressure applied thereon and destruction of active elements by displacement of spacers can be minimized.

Further, the liquid crystal/polymer composite material has the same specific resistance as the conventional TN-LCD. Accordingly, it is unnecessary to provide a large storage capacitance for each picture element electrode as the conventional DSM-LCD had. Accordingly, designing of active elements can be facilitated and the ratio of an effective picture element electrode area can be increased, and power consumption of the liquid crystal optical element can be small.

Further, the liquid crystal optical element can be produced only by eliminating the orientation film forming step from a conventional process of production of TN-LCD.

In addition, the liquid crystal optical element using the liquid crystal/polymer composite material can be produced in a stable manner, and a product satisfying requisite performance can be obtained in high yield.

In the present invention, various applications are possible so long as the effect by the present invention is not reduced.

What is claimed is:

1. A liquid crystal optical element comprising:
   a pair of substrates with electrodes, and
   a liquid crystal/polymer composite material interposed between the pair of substrates,
   wherein the polymer of the liquid crystal/polymer composite is a cured product of a curable material comprising an addition-polymerizable urethane compound comprising at least 10 weight percent of an addition-polymerizable acrylurethane compound obtained from a non-cyclic branched aliphatic isocyanate compound.

2. The liquid crystal optical element according to claim 1, wherein the addition-polymerizable urethane compound is a reaction product of a non-cyclic branched aliphatic isocyanate compound, a polyether polyol and a hydroxyl group-containing acrylate.

3. The liquid crystal optical element according to claim 2, wherein the polyether polyol is polypropylene glycol.

4. The liquid crystal optical element according to claim 1, wherein the curable mixture further comprises other addition-polymerizable compounds.

5. The liquid crystal optical element according to claim 1, wherein an electric field penetrating the liquid crystal/polymer composite material is changed in response to an outer signal, and a half tone display is effected due to a non-saturated electric field value.

6. The liquid crystal optical element according to claim 1, wherein an active matrix substrate and a counter substrate are provided.

7. A projection liquid crystal display apparatus comprising the liquid crystal optical element according to claim 1, a projection light source and a projection light system.

8. The liquid crystal optical element according to claim 1, wherein said element transmits or scatters light upon the application of voltage.

9. The liquid crystal optical element according to claim 1, in which $n_o - 0.03 < n_p < n_o + 0.05$ wherein $n_p$ is the refractive index of the polymer and $n_o$ is the ordinary refractive index, or $n_e - 0.03 < n_p < n_e + 0.05$ wherein $n_e$ is the extraordinary refractive index of the liquid crystal in the liquid crystal/polymer composite material.

10. The liquid crystal optical element according to claim 1, wherein said acrylurethane is prepared by reacting at least one non-cyclic branched diisocyanate, a polyether polyol and a hydroxy alkyl acrylate.

11. A method for producing a liquid crystal optical element comprising:
    interposing a mixture of a curable material comprising an addition-polymerizable compound and liquid crystal between a pair of substrates with electrodes, and forming a polymer phase by curing the curable material and separating the liquid crystal by phase separation to thereby form a liquid crystal/polymer composite material comprising the polymer phase and the liquid crystal, wherein the curable material comprises an addition-polymerizable urethane compound comprising at least 10 wt % of addition-polymerizable acrylurethane compounds obtained from non-cyclic branched aliphatic isocyanate compounds.

12. The method for producing a liquid crystal optical element according to claim 11, wherein the addition-polymerizable urethane compound is a reaction product of a non-cyclic branched aliphatic isocyanate compound, a polyether polyol and a hydroxyl group-containing acrylate.

13. The method for producing a liquid crystal optical element according to claim 11, wherein the curable mixture further comprises other addition-polymerizable compounds.

14. The method for producing a liquid crystal optical element according to claim 11, wherein curing is conducted by irradiating light.

* * * * *